United States Patent
Blondel et al.

(10) Patent No.: US 9,555,343 B2
(45) Date of Patent: Jan. 31, 2017

(54) PROCESS FOR THE PURIFICATION OF A RESIDUE

(75) Inventors: Jean-Marie Blondel, Etterbeek (BE); Cedric Humblot, Fontenay-sous-Bois (FR)

(73) Assignee: SOLVAY SA, Brussels (BE)

( * ) Notice: Subject to any disclaimer, the term of this patent is extended or adjusted under 35 U.S.C. 154(b) by 591 days.

(21) Appl. No.: 13/984,114

(22) PCT Filed: Feb. 9, 2012

(86) PCT No.: PCT/EP2012/052191
§ 371 (c)(1),
(2), (4) Date: Aug. 7, 2013

(87) PCT Pub. No.: WO2012/107516
PCT Pub. Date: Aug. 16, 2012

(65) Prior Publication Data
US 2013/0319293 A1    Dec. 5, 2013

(30) Foreign Application Priority Data
Feb. 9, 2011   (EP) .................... 11153920

(51) Int. Cl.
| G02F 1/00 | (2006.01) |
| B01D 11/02 | (2006.01) |
| C04B 7/36 | (2006.01) |
| C04B 7/60 | (2006.01) |
| C04B 18/16 | (2006.01) |
| C01D 3/06 | (2006.01) |

(52) U.S. Cl.
CPC ............. B01D 11/02 (2013.01); B01D 11/023 (2013.01); C01D 3/06 (2013.01); C04B 7/365 (2013.01); C04B 7/60 (2013.01); C04B 18/162 (2013.01); *Y02W 30/95* (2015.05)

(58) Field of Classification Search
None
See application file for complete search history.

(56) References Cited

U.S. PATENT DOCUMENTS

| 3,925,534 A | 12/1975 | Singleton et al. |
| 4,402,891 A | 9/1983 | Kachinski, Jr. |
| 6,241,101 B1 | 6/2001 | Roodenrijs |

FOREIGN PATENT DOCUMENTS

| EP | 0517985 A1 | 12/1992 |
| GB | 2001865 A | 2/1979 |
| JP | 11-35350 A | 2/1999 |
| JP | 2001130933 A | 5/2001 |
| JP | 2002338312 A | 11/2002 |
| NL | 7807214 A | 2/1979 |
| WO | WO 2009150444 A1 | 12/2009 |
| WO | WO 2011048135 A1 | 4/2011 |

*Primary Examiner* — Eric Golightly

(57) ABSTRACT

Process for the purification of a residue containing solids and mother liquor and having a chloride ion content greater than 5000 ppm by weight relative to the weight of the residue which comprises (a) piston washing said residue with a washing fluid and (b) recovering a purified residue.

14 Claims, 1 Drawing Sheet

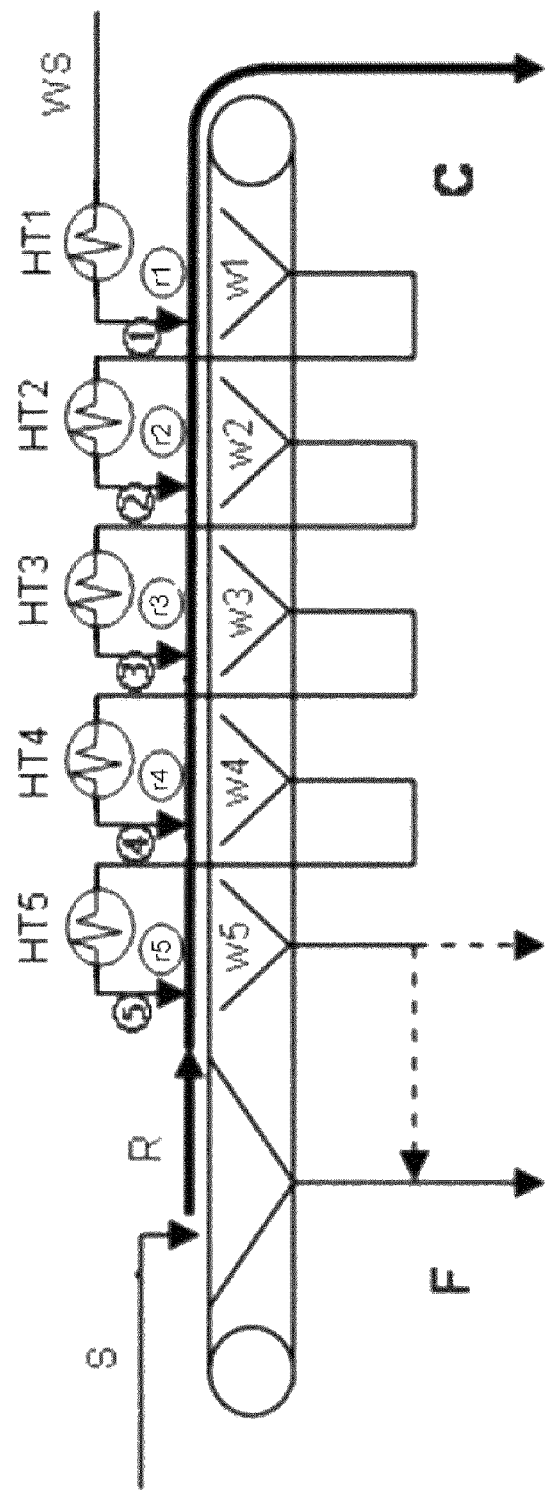

PROCESS FOR THE PURIFICATION OF A RESIDUE

CROSS-REFERENCE TO RELATED APPLICATIONS

The present application is a U.S. national stage entry under 35 U.S.C. §371 of International Application No. PCT/EP2012/052191 filed Feb. 9, 2012, which claims priority to European Application No. 11153920.1 filed on Feb. 9, 2011, the whole content of this application being herein incorporated by reference for all purposes.

The present invention concerns a process for the purification of a residue, in particular obtained from cement kiln dust or cement by-pass dusts or from by-products of metal manufacture, and a process for the manufacture of cement or metal comprising the aforesaid purification process.

BACKGROUND OF THE INVENTION

The residues of many industrial processes contain soluble salts which make the disposal of these residues more difficult and expensive, insofar as these soluble salts run the risk of being leached out and contaminating the subsoil of the disposal site.

International Patent Application WO-A-2011/048135 in the name of Solvay SA the entire contents of which is incorporated by reference into the present patent application provides processes that make it possible to recycle the soluble salts contained in some industrial residues, in particular to recycle potassium chloride or sodium chloride.

SUMMARY OF THE INVENTION

It has been found that the disposal of residues which contain valuable raw materials for aforesaid industrial processes, in particular cement manufacture, affects the economics of said processes.

The invention now makes available a process which allows for recovering at least partially the raw materials from residues of industrial processes.

The invention concerns in consequence a process for the purification of a residue containing solids and mother liquor and having a chloride ion content greater than 5000 ppm by weight relative to the weight of the residue which comprises (a) piston washing said residue with a washing fluid and (b) recovering a purified residue. If desired, e.g. in the case of cement kiln dust, the purified residue can be recycled in wet form to the cement production process. If desired, the washing fluid, e.g. water, can be removed partially or completely from the purified residue. This can be effected by dewatering, e.g. by blowing air through the residue, or drying, e.g. by applying heat and blowing air through the residue.

It has been found, surprisingly, that the process according to the invention allows for recovering a purified residue, having, in particular, adequate residual chloride content while minimizing use of washing fluid, in particular water.

BRIEF DESCRIPTION OF THE DRAWINGS

FIG. 1 shows an apparatus useful for performing the process of the present invention. It is of the vacuum belt filter type, operates at counter current of washing liquid and residue (filter cake) and comprises a drum roller to compact the extracted residue, several heat exchangers, and several vacuum boxes for the extraction fluid ("washing fluid").

DETAILED DESCRIPTION

The process according to the invention allows for efficient removal of soluble salts from residues of industrial processes. In particular, it is generally possible to reduce the chloride ion content to less than 5000 ppm, often to less than 3000 ppm by weight relative to the weight of the residue. The chloride ion content is a suitable tracker for the presence of soluble salts in the residue and can be measured by argentometric titration. Hence it is possible to recover a purified residue which is generally suitable for re-use in an industrial process. Usually, said industrial process is the same process from which the residue containing solids and mother liquor has been recovered.

"Piston washing" is understood to denote in particular a washing operation wherein washing fluid is transported through a layer of residue by an operation applying a force to the layer of residue. Such operations include, for example, applying pressure to the washing fluid or applying vacuum to the residue. In the process according to the invention, piston washing is generally carried out so as to substantially or completely displace the mother liquor contained in the residue. Piston washing can also be applied as a multi staged counter current perfectly mixed washing carried out so as to substantially or completely displace the mother liquor contained in the residue.

"Mother liquor" is understood to denote in particular a liquid fraction containing impurities dissolved therein. Typically, mother liquors in the present invention include aqueous fractions containing water-soluble salts dissolved therein.

The residue which is purified in the process according to the invention wherein the residue can be obtained for example by treating by-products from metallurgical manufacture, preferably from steel manufacture, or by treating cement kiln dust or cement by-pass dusts from cement production: Cement kiln dust (CKD) is preferably the fine-grained, solid, highly alkaline waste removed from cement kiln exhaust gas by air pollution control devices. A suitable treatment comprises for example contacting aforesaid by-products or cement kiln dust with water so as to provide a suspension of solids in a solution of water soluble impurities. If appropriate, said suspension can be concentrated, for example filtered to provide a residue containing solids and mother liquor and having a chloride ion content greater than 5000 ppm by weight relative to the weight of the residue.

The aforesaid treatment can be suitably carried out in a stirred reactor. If the residue is containing soluble sulfate ions, a pretreatment can be done with reagents generating soluble calcium ions. This can be carried out, for example according to the process described in WO-A-2011/048135.

"Washing fluid" is understood to denote in particular a liquid fraction capable of displacing the mother liquor. Usually, the content of impurities dissolved in the washing fluid is lower than the content of impurities dissolved in the mother liquor. Typical washing fluids in the present invention include water or aqueous fractions containing water-soluble salts dissolved therein having a lower content of water-soluble salts than the mother liquor. In the latter case, the ratio of the Cl-concentration of the washing fluid to the Cl-concentration of the mother liquor is generally from 0.05 to 0.9, often from 0.1 to 0.8. pH of washing fluid is generally from 7 to 13, often from 7 to 10. Water is a preferred washing fluid.

In a particular aspect of the process according to the invention, washing fluid removed from a first washing step is recovered and used as washing fluid for a further washing step.

Washing fluid removed from a washing step can also suitably be recovered and (a) recycled to a treatment to obtain residue or (b) treated to recover soluble material dissolved therein. If appropriate, KCl is a preferred soluble material which can be recovered. This can be carried out, for example according to the process described in WO-A-2011/048135.

In the process according to the invention the chloride ion content in the residue is generally from 3 to 95% wt., often from 4 to 40 wt. % preferably from 5 to 20% wt. relative to the total weight of the residue. In another aspect the chloride ion content in the residue is at most 30% wt. In still another aspect the chloride ion content in the residue is at most 10% wt.

In the process according to the invention, particular examples of techniques allowing for piston washing include centrifugation, press filtration and, preferably, vacuum filtration. In the process according to the invention, the piston washing is generally carried out by conveying the washing fluid to a layer of residue disposed in a means for piston washing. Apparatuses are known which operate according to different methods of applying piston washing.

One alternative of such apparatuses are those applying pressure on the residue. This pressure can be applied mechanically by a plate or a drum roller pressed on the filter cake by gravity or by hydraulic forces, and/or by using a washing fluid applied under pressure. Such apparatus usually contain a filter cloth which allows fluids, especially the mother liquor and the washing fluid, to pass, but retains solids. Often, the filter cloth is continuous and moves forward for regeneration, e.g. when the residue (filter cake) reaches a pre-set pressure drop. The purified residue may be removed from the filter cloth mechanically, e.g. by scrapers, optionally after dewatering or drying.

Another alternative are filter apparatuses wherein the pressure of the atmosphere on the filter side in contact with the residue is higher than the pressure of the atmosphere on the other side of the filter. Usually, the atmosphere is air unless inert gases are advantageous due to the nature of the solids, the mother liquor or the washing fluid. For the treatment of cement kiln residues, the process is preferably performed in an atmosphere formed from—potentially moist—air. The lowering of the pressure can be effected by suction pumps which remove washing fluid having passed the filter. This suction provides a lowering of the pressure. It is also possible to provide vacuum pumps which remove a part of the atmosphere on the side of the washing fluid having passed the filter.

Apparatus are very suitable in which the mother liquor and the washing fluid are removed mechanically, especially by a roller drum, and by applying a vacuum.

In existing apparatus, the filter cloth may be supported by belts. Such apparatus are belt filter apparatus. Belt filter apparatuses are preferred because of their reliable operation.

In particular the layer of residue may be placed on a vacuum filter.

Suitable apparatuses are available on the market. For example, pressure belt filters, suction belt filters and vacuum belt filters are available from Hoffmann Maschinen- and Apparatebau GmbH, Lengede/Germany, as described in the internet under http://www.hoffmannfilter.de/english/druckbandfilter.htm, http://www.hoffmannfilter.de/english/saugbandfilter.htm and http://www.hoffmannfilter.de/english/unterdruck_bandfilter.htm Particular means for piston washing are selected from a Larox® filter, e.g. the "horizontal vacuum belt filters", for example, types "RT", "GT", "Pannevis RB/RT" type, or automatic pressure filters "C series" and "M series", and a centrifuge.

Preferred means for piston washing are vacuum filters, preferably selected from a drum filter and, most preferably, a vacuum belt filter.

In a particular embodiment, the process according to the invention is a process for the purification of a residue containing solids and mother liquor and having a chloride ion content greater than 5000 ppm by weight relative to the weight of the residue which comprises (a) distributing a layer of said residue on a belt filter and (b) transporting washing fluid through the layer of residue by an operation applying a force to the layer of residue and (c) recovering a purified residue.

As mentioned above, the residue to be purified is often distributed on a filter, e.g. a filter cloth which preferably is supported by a belt. An even distribution is preferred. If desired, the mother liquor can be removed by applying pressure on the residue.

When the process according to the invention is carried out under pressure, the filtration pressure is generally from 1 to 30 bar, preferably from 3 to 10 bar for press filters and from 0.3 to 1 bar, preferably from 0.5 to 0.9 bar for vacuum filters.

In the process according to the invention, the temperature of the washing fluid is generally equal to or higher than 10° C. Preferably, it is equal to or lower than 1° C. below the boiling point of the washing fluid. Preferably, the temperature of the washing fluid is from 10 to 99° C., more preferably from 20 to 80° C.; the preferred and more preferred range applies especially when the washing fluid is constituted from water which may contain impurities.

When the process according to the invention comprises piston washing a layer of residue, the thickness of said layer, especially when a belt filter as described herein before is used, is generally from 0.3 to 10 cm, preferably from 1 to 5 cm, more preferably from 1 to 3 cm. In another aspect, the thickness of said layer is generally from 2 to 10 cm, preferably from 3 to 7 cm.

In the process according to the invention, especially when a belt filter as described herein before is used, the ratio of the total volume of washing fluid supplied to the residue to the volume of mother liquor in the residue supplied to the washing step is generally equal to or greater than 0.5. Often this ratio is equal to or greater than 0.8. Preferably this ratio is equal to or greater than 0.9. This ratio is generally equal to or lower than 5. Often this ratio is equal to or lower than 2. Preferably this ratio is equal to or lower than 1.5.

In a preferred embodiment of the process according to the invention, which is particularly preferred when the washing is carried out on a belt filter, the washing fluid is applied to the residue by spraying. More preferably the washing fluid is applied by flat spraying.

It has been found, surprisingly, that this embodiment allows for particularly efficient washing, notably by minimizing cracks in the filter cake.

Suitable devices for applying the washing fluid by spraying include nozzles, in particular nozzles allowing to spray the fluid in the form of a fan, In that case, the spraying angle I generally from 45° to 110°. When a belt filter is used, it is preferred to arrange the nozzle such that all the residue moves across the crest. The feed pressure of the nozzle is suitably adapted to avoid washing away the residue from the filter.

In a preferred embodiment of the process according to the invention, the layer is disposed on a transportation device, in particular a moving belt filter and the piston washing is carried out in counter-current mode, comprising at least 2, often 2 to 10 washing steps, preferably 2, 3, 4 or 5, more preferably 2 washing steps. In that case, preferably, a pure washing fluid, for example pure water is introduced into a first washing step. Washing fluid recovered from said first washing step is recovered and used as washing fluid for a subsequent washing step carried out upstream relative to the first washing step.

FIG. 1 is illustrating an apparatus designed for counter current washing in according to a preferred embodiment of the invention. The apparatus used is of the vacuum belt filter type with drum rollers r1 to r5. These drum rollers are indicated in FIG. 1 in the form of circles with internal inscription "r1" to "r5" between the respective vacuum box and the respective heat exchanger, just above the belt; the drum rollers serve to compact the residue. Residues R are distributed on belt filter in the form of a suspension S. The residue is moving from left to right in the apparatus given in FIG. 1. Fresh pure washing water WS is introduced as washing fluid down stream the cake displacement on the belt at point ①. The washing water WS is heated by means of the heat exchanger HT1. Filtrate extracted from the cake is collected in vacuum box w1; air is blown through the filter cake for effecting air displacement dewatering of the filter cake. The washing fluid from vacuum box w1 is pumped to be heated by means of the heat exchanger HT2 and used as washing fluid for washing step at point ②. Drum roller drum r1 compacts the residue. The filter cake is once again dewatered by removing the washing fluid from it by means of air displacement dewatering. The washing fluid extracted from the filter cake is collected in vacuum box w2. It is pumped out of the vacuum box w2, heated by heat exchanger HT3 and used as washing fluid for washing step at point ③. Drum roller r2 compacts the residue. Filtrate extracted from cake by means of another air displacement dewatering is collected in vacuum box w3, afterwords pumped out, heated with the heat exchanger HT4 and used as washing fluid for washing step at point ④. Drum roller r3 compacts the residue. Filtrate being extracted from the filter cake by means of still another air displacement dewatering is collected in vacuum box w4, afterwords pumped out, heated with the heat exchanger HT5 and used as washing solution for washing step at point ⑤. Drum roller r4 compacts the residue. Filtrate extracted from the filter cake during air displacement dewatering is collected in vacuum box w5. Afterwords, filtrate F is pumped out from vacuum box w5 and send to a further chemical treatment if needed. Drum roller r5 compacts the residue. Purified residue C is recycled to production.

In a further preferred embodiment of the process according to the invention the piston washing is carried out under conditions minimizing, preferably substantially avoiding formation of cracks in the residue. A particular means for minimizing, preferably substantially avoiding formation of cracks in the residue comprises carrying out the washing on a filter, in particular a belt filter further equipped with a means for applying mechanical pressure to the residue.

In that case, the mechanical pressure is generally from 0.5 to 20 ba, preferably from 1 to 5 bar.

A drum roller is a preferred means for applying mechanical pressure to the residue. In a particular aspect, the means for applying mechanical pressure is movable relative to the residue surface. The term "movable" means especially that the means for applying pressure, especially a drum roller, is arranged in the apparatus in such a way than the linear speed of the drum roller surface can be higher than the linear speed of the cake. The relative speed of the roller versus the residue (filter cake) linear speed can be the same as the residue. It may be higher, preferably equal to or lower than 30% higher. A preferred range is from 0 (0 being included) to 30% higher, more preferably, the range is from 5 to 10%.

The process according to the invention often further comprises expelling washing fluid, preferably dewatering the residue after primary removal of the washing fluid. Such expelling is preferably carried out by contacting purified residue with a gas stream, in particular an air stream. In that case, the chloride content of the residue obtained after expelling washing fluid is generally less than 5000 ppm wt., preferably less than 3000 ppm.

In that case, the expelling of the washing fluid from the residue is generally carried under conditions allowing to obtain a washing fluid content in the residue of at most 40% weight relative to the weight of the residue. Preferably, this content is equal to or less than 35% weight relative to the weight of the residue. Generally this content is at least 28% weight relative to the weight of the residue. Preferably, this content is equal to or more than 30% weight relative to the weight of the residue.

It has been found, surprisingly, that the residues treated according to the invention may display thixotropic behaviour. Controlling the washing fluid content in the residue in the ranges cited here before allow to obtain a non thixotropic residue. This residue is particularly interesting for processing in further processes such as cement manufacture or metal manufacture. The invention also concerns such non-thixotropic residue obtainable by the process according to the invention.

The invention concerns also a manufacturing process for the manufacture of cement or a metal which comprises
a) the process according to the invention
b) using purified residue obtained in step a. as a raw material for said manufacture.

The examples hereafter are intended to illustrate the invention without however limiting it.

Example 1

Piston Washing of a Cement Kiln Dust (CKD) Residue on a Belt Filter with a 3-Step Washing A flow rate of 150 kg/h of CKD is agitated in a stirred reactor with 70 L/h of water and 120 L/h of a recycled brine from the filtration of the produced suspension. The suspension is filtered over a belt filter.

The residue containing a mother liquor having a Cl content of 15.6% wt. relative to the total liquid weight and a solid content of 27% wt. relative to the suspension weight is continuously disposed as an, on the average, 15 mm thick layer on a belt filter to which a vacuum of 600 mbar is applied.

The filter cake produced without washing has a Cl content of 11% wt. relative to the cake weight after drying.

Countercurrent piston washing is carried out by carrying out a first washing with a flow rate of 150 L/h of pure water as washing fluid, a second upstream washing with washing fluid recovered from the first washing and a third upstream washing with washing fluid recovered from the second washing. The washing fluid from the third washing is used as raw material for the process described in WO-A-2011/048135. Downstream from the first washing, an air stream is applied to the purified residue to expel water. The chloride ion content of the dewatered residue is lower than 5000 ppm. The dewatered residue is recycled to a cement manufacture.

Example 2

Piston Washing of a CKD Residue on a Belt Filter Equipped with a Drum Roller

The process according to the invention is carried out as in example 1, but in a belt filter equipped with a drum roller, applying a mechanical pressure of 2 bar to the layer of residue at the end of the last washing. The chloride ion content of the dewatered residue is lower than 3000 ppm.

Example 3

Piston Washing of a Cement Kiln Dust (CKD) Residue on a Belt Filter with a 2-Step Washing 42 kg/h of CKD by-pass residue was agitated in a stirred reactor with 70 L/h of water. The suspension is filtered over a belt filter.

The residue containing a mother liquor having a Cl content of 12% wt. relative to the total liquid weight and a solid content of 30% wt. relative to the suspension weight is continuously disposed through a goose-foot shaped weir system on a zone of the belt fabric filter which is not under vacuum as an, on the average, 15 mm thick layer. The layer was moved along the belt filter while a vacuum of 500 mbar was applied.

Countercurrent washing was carried out by applying a first washing with a flow rate of 35 L/h of demineralized water as washing fluid. The washing fluid was sprayed onto the layer through a DELAVAN AC2 nozzle. A second upstream washing was carried out with washing fluid recovered from the first washing Downstream from the first washing, an air stream was applied to the purified residue to expel water. The water content of the treated residue was 37% wt. and the chloride-ion content was 0.6 g/kg. The residue was not thixotropic and can be recycled for cement production. A sample of the residue was completely dried. The chloride ion content of that residue was 0.9 g/kg.

The invention claimed is:

1. A process for the purification of a residue obtained from cement kiln dust, said residue containing solids and a mother liquor and having a chloride ion content greater than 5000 ppm by weight relative to the weight of the residue, said process comprising: (a) a piston washing operation, wherein a washing fluid is transported through a layer of said residue by applying a force to said residue layer; (b) recovering a purified residue; and (c) recovering and treating the washing fluid removed from the washing operation (a) to recover KCl dissolved in said washing fluid;
wherein the piston washing operation (a) is carried out by conveying the washing fluid to the residue placed on a vacuum belt filter and wherein the piston washing operation (a) comprises at least 2 washing steps and is carried out in a counter-current mode and wherein the washing fluid removed from a first washing step is recovered and used as washing fluid for a further washing step.

2. The process according to claim 1, wherein said washing fluid is water.

3. The process according to claim 1, wherein the piston washing operation (a) is carried out under conditions minimizing formation of cracks in the residue.

4. The process according to claim 1, wherein the thickness of the residue layer is from 0.8 to 3 cm.

5. The process according to claim 1, wherein the ratio of the total volume of said washing fluid supplied to the residue to the volume of said mother liquor in the residue supplied to the washing operation (a) is from 0.5 to 5.

6. The process according to claim 1, wherein the washing fluid is applied to the residue by spraying.

7. The process according to claim 1, wherein the chloride content of the residue is from 3 to 95% wt.

8. The process according to claim 1, further comprising expelling said washing fluid from said residue with a gas stream.

9. The process according to claim 8, wherein the expelling step of the washing fluid from the residue is carried under conditions allowing to obtain a washing fluid content in the residue of at most 40% weight relative to the weight of the residue.

10. The process according to claim 8, wherein the chloride content of the purified residue obtained after expelling said washing fluid is less than 5000 ppm wt.

11. The process according to claim 1, wherein the residue is obtained by dissolving a water-soluble fraction of cement kiln dust from cement production with water.

12. A process for the manufacture of cement or a metal which comprises
a. Carrying out a process for the purification of a residue obtained from cement kiln dust, said residue containing solids and a mother liquor and having a chloride ion content greater than 5000 ppm by weight relative to the weight of the residue, said process comprising: (a) a piston washing operation, wherein a washing fluid is transported through a layer of said residue by applying a force to said residue layer; (b) recovering a purified residue; and (c) recovering and treating the washing fluid removed from the washing operation (a) to recover KCl dissolved in said washing fluid;
wherein the piston washing operation (a) is carried out by conveying the washing fluid to the residue placed on a vacuum belt filter and wherein the piston washing operation (a) comprises at least 2 washing steps and is carried out in a counter-current mode and wherein the washing fluid removed from a first washing step is recovered and used as washing fluid for a further washing step; and
b. Using said purified residue as a raw material for said manufacture.

13. The process according to claim 8, wherein the expelling of the washing fluid from the residue is carried under conditions allowing to obtain a washing fluid content in the residue of from 30 to 35% weight relative to the weight of the residue; and wherein the residue is non-thixotropic.

14. The process according to claim 1, wherein the cement kiln dust is cement by-pass dust.

* * * * *